(12) United States Patent
Slegers et al.

(10) Patent No.: US 8,110,998 B2
(45) Date of Patent: Feb. 7, 2012

(54) MULTI-PULSE IGNITION CIRCUIT FOR A GAS DISCHARGE LAMP

(75) Inventors: Frans Slegers, Eindhoven (NL); Christofher Daniel Charles Hooijer, Eindhoven (NL); Thijs Oosterbaan, Eindhoven (NL); Johannis Antonie Amerens Toonen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 117 days.

(21) Appl. No.: 11/572,235

(22) PCT Filed: Jul. 14, 2005

(86) PCT No.: PCT/IB2005/052347
§ 371 (c)(1),
(2), (4) Date: Jan. 17, 2007

(87) PCT Pub. No.: WO2006/011097
PCT Pub. Date: Feb. 2, 2006

(65) Prior Publication Data
US 2008/0093996 A1   Apr. 24, 2008

(30) Foreign Application Priority Data
Jul. 21, 2004   (EP) .................................... 04103475

(51) Int. Cl.
H05B 39/00   (2006.01)

(52) U.S. Cl. .................... 315/209 R; 315/307; 315/224; 315/225

(58) Field of Classification Search .............. 315/209 R, 315/219, 291, 224, 225
See application file for complete search history.

(56) References Cited

U.S. PATENT DOCUMENTS

| | | | | |
|---|---|---|---|---|
| 4,230,971 A | * | 10/1980 | Gerhard et al. | 315/307 |
| 5,384,518 A | * | 1/1995 | Kido et al. | 315/225 |
| 5,561,349 A | * | 10/1996 | Hartai | 315/209 R |
| 6,008,591 A | * | 12/1999 | Huber et al. | 315/219 |
| 6,323,600 B1 | | 11/2001 | Statnic et al. | |
| 6,414,446 B2 | | 7/2002 | Krijzer et al. | |

* cited by examiner

*Primary Examiner* — Douglas W Owens
*Assistant Examiner* — Jianzi Chen

(57) ABSTRACT

An ignition circuit for igniting a gas discharge lamp generates a high voltage gas breakdown pulse by building up a current through a primary winding of a transformer. After a predetermined period and thus when a predetermined current flows through the primary winding, a capacitance is switched in series with said primary winding, thereby generating said high voltage gas breakdown pulse in a secondary winding of said transformer. After generating the high voltage pulse, the capacitance is short-circuited in order to preserve energy in the primary winding. The preserved energy is employed to build up energy again for a next high voltage pulse in a short time. At a high repetition rate and high voltage of the generated pulses, the ignition circuit according to the present invention is also suitable for driving the gas discharge lamp during a take-over period following the gas breakdown of the lamp for heating the lamp electrodes.

14 Claims, 2 Drawing Sheets

MULTI-PULSE IGNITION CIRCUIT FOR A GAS DISCHARGE LAMP

The present invention relates to an ignition circuit for a gas discharge lamp and in particular to a multi-pulse ignition circuit.

A gas discharge lamp needs a high ignition voltage to switch on. The high voltage is needed to generate a gas breakdown between two electrodes of the lamp. Thereafter, during a take-over period, a high voltage is needed to heat the electrodes. When the electrodes are heated, a lower operation voltage is needed to keep the lamp on.

The voltage for generating a gas breakdown may be a high voltage pulse. However, the lamp may not switch on at a first pulse. Therefore, a series of pulses may be needed to switch on the lamp. Thereto, multi-pulse ignition circuits are known in the art.

In U.S. Pat. No. 6,008,591, a multi-pulse ignition circuit is disclosed. The ignition circuit comprises a transformer of which a secondary winding is connected to a lamp and a primary winding is connected to a circuit triggering an ignition pulse. The primary winding is connected in series with a transistor that functions as a switch. The transistor is switched on and off by a driving circuit. The ignition circuit generates pulses at a repetition frequency of about 2 kHz. The ignition circuit is only applied for generating the gas breakdown pulses. After gas breakdown, a lamp ballast circuit takes over to operate the lamp during a take-over period (during which the electrodes of the lamp are heated) and/or to provide a steady-state operating voltage and current.

It is disadvantageous that the above-described ignition circuit is only suitable for generating pulses at a pulse repetition frequency of about 2-3 kHz. Thus, it may take a relatively long time before the gas breakdown occurs.

It is an object of the present invention to provide an ignition circuit and method for a gas discharge lamp, the circuit and method generating high voltage pulses at a high frequency.

The above object is achieved in the ignition circuit as described in claim 1 and the ignition method as described in claim 7.

In operation, the ignition circuit according to the present invention is connected to a voltage source. The voltage source is connected in series with an inductance and a parallel circuit of a switching circuit and a capacitance. When the switching circuit is closed, i.e. conducts, a current is built up in the circuit comprising the inductive element and the voltage source. As soon as the switching circuit opens, i.e. switches to a non-conducting state, a resonant circuit comprising the inductance, the capacitance and the voltage source is formed, thereby generating a high voltage pulse in said inductance. The gas discharge lamp is coupled to said inductance (inductive element) such that the high voltage pulse is also generated over the lamp, thereby providing a gas breakdown pulse.

A current flowing through an inductive element, such as a coil, a winding or a primary winding of a transformer, comprises an amount of energy. To enable a high repetition rate, as much of said energy as possible should be preserved in the inductive element, when the switching circuit is opened, i.e. is switched to a non-conducting state. By preserving said energy, it is possible to build up enough energy for a next pulse in a short time.

An amount of energy may be preserved in the inductive element by closing the switching circuit before the energy previously build up in the circuit is dissipated in the ignition circuit. For example, the circuit may be provided with a voltage detection circuit for determining a voltage over the inductive element, the circuit being configured to close the switching circuit when said voltage is substantially zero after said high voltage pulse.

Further, the ignition circuit according to the present invention dissipates only a small amount of energy. Thus, the ignition circuit may generate high voltage ignition pulses at a high repetition rate using only little energy.

To generate a gas breakdown in a gas discharge lamp, it is advantageous to have a high voltage during a relatively long period per unit time. The circuit according to the present invention may generate pulses having a large width and at a high repetition frequency, for example at least 10 kHz. Using a large number of high voltage pulses having a large pulse width, a high voltage may be generated during said relatively long period per unit time. For example, the circuit according to the present invention may generate pulses having a pulse width of 1 µs at a frequency of 30 kHz. Thus, 30000 pulses per second and 1 µs per pulse results in a high voltage during 30 ms per second.

A prior art ignition circuit is configured to generate a pulse amplitude higher than required for a gas breakdown. Due to a low accuracy of the circuit, the actually generated pulse amplitude may be lower, resulting in a voltage being lower than the gas breakdown voltage, thus being unsuitable for generating a gas breakdown. In the circuit according to the present invention, the generated pulse, in particular the amplitude and the width of said pulse, is generated with a high accuracy. Therefore, the maximum pulse amplitude, i.e. the maximum generated voltage, may be kept relatively low, which is advantageous with respect to the safety for users of the lamp during operation, while the minimum generated voltage is kept high enough to generate a gas breakdown.

In an embodiment, the inductive element is a winding, and in a particular embodiment a primary winding of a transformer, a secondary winding of said transformer being connected with said lamp. Thus, the gas discharge lamp may be directly coupled to said winding, or the lamp may be indirectly coupled to said winding by the secondary winding of the transformer.

Using a transformer, a high voltage pulse is generated in the secondary winding when the high voltage pulse is generated in the primary winding. Selecting the primary winding and secondary winding of the transformer in a predetermined ratio, the amplitude of the pulse in the secondary winding may be selected. Further, by using a transformer to couple the lamp to the inductive element, a ballast circuit for operating the lamp in a steady state may be coupled to the lamp without employing additional components to decouple the ignition circuit and said ballast circuit.

After gas breakdown, a high voltage is to be supplied to the lamp for keeping the lamp on and heating the electrodes of the lamp during the take-over period. The high frequency high voltage pulses generated using the ignition circuit according to the present invention are suitable for driving the lamp during the take-over period, since the amplitude and width of the pulses may prevent extinguishing of the lamp.

In an embodiment of the present invention, the switching circuit comprises a transistor and a switch driving circuit connected to a gate of said transistor. The transistor is suitable for high frequency switching. The switch driving circuit may be any suitable circuit for supplying a signal comprising short pulses at a high repetition rate for said high frequency switching of said transistor.

These and other aspects of the present invention will be apparent from and elucidated with reference to the embodiments described hereinafter.

The annexed drawings show non-limiting exemplary embodiments, wherein

FIG. 1 schematically shows an ignition circuit according to the present invention;

In the drawings, identical reference numerals indicate similar components or components with a similar function.

Figure 1:
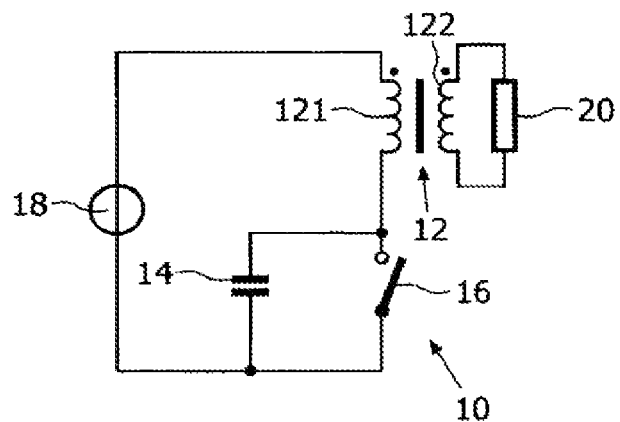

FIG. 1 shows an ignition circuit 10 comprising a primary winding 121 of a transformer 12, a capacitor 14 and a switch 16. The ignition circuit 10 is coupled to a voltage source 18. A secondary winding 122 of the transformer 12 is coupled to a gas discharge lamp circuit 20. The gas discharge lamp circuit 20 comprises a gas discharge lamp and possibly one or more other components.

Figure 2:
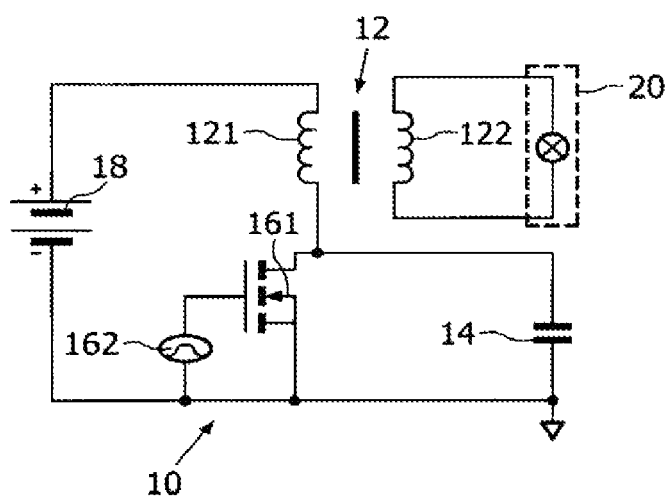
FIG. 2 shows a diagram of an embodiment of the ignition circuit according to the present invention.

In the exemplary embodiment shown in FIG. 2 the switch is embodied in a transistor 161 and a switch driving circuit 162. The transistor 161 is a MOSFET transistor having a body diode. From the description of the functioning of the ignition circuit 10 below, it will be apparent to the person skilled in the art that any circuit or component suitable for high frequency switching of a current may embody the switch. Below, the functioning of the ignition circuit 10 according to the present invention is elucidated with reference to FIGS. 2, 3A and 3B.

Figure 3A:
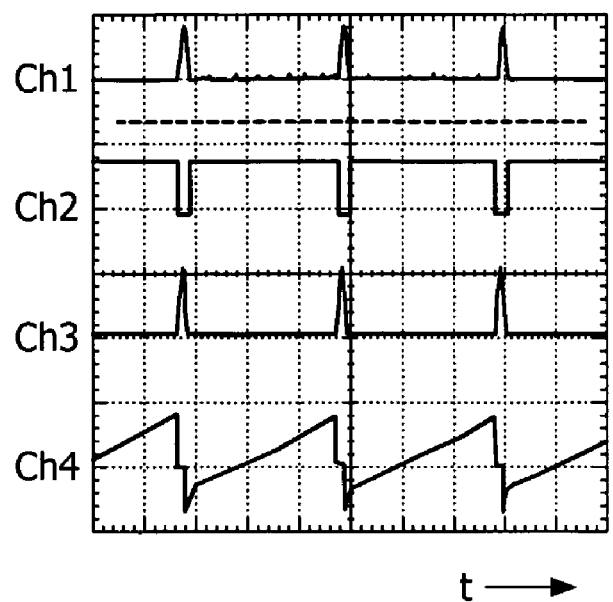
FIG. 3A shows a drain voltage, a gate voltage, an ignition voltage and a drain current in the embodiment of FIG. 2.
Figure 3B:
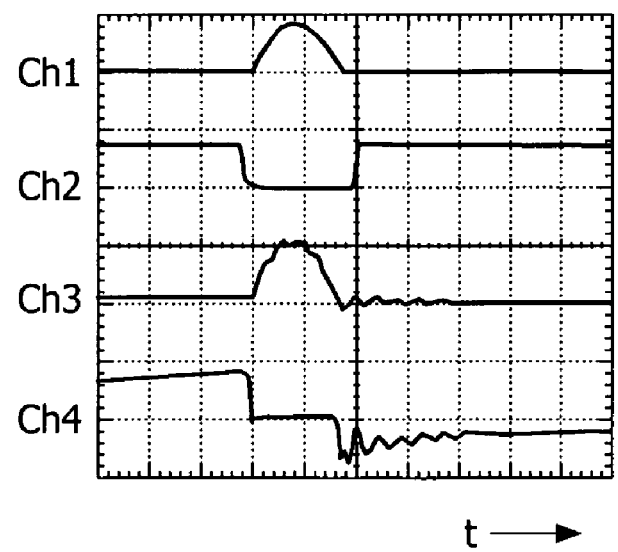
FIG. 3B shows an enlarged view of the voltages and current shown in FIG. 3A.

In FIGS. 3A and 3B, four graphs Ch1, Ch2, Ch3, and Ch4 are shown. The upper graph Ch1 shows a drain voltage, the graph Ch2 shows a gate voltage, the graph Ch3 shows an ignition voltage and the lower graph Ch4 shows a drain current of the circuit shown in FIG. 2. The graphs Ch1, Ch2, Ch3, and Ch4 are shown as a function of time. In FIG. 3B, a time scale enlarged with respect to FIG. 3A is used, thereby giving an enlarged view of the voltages and the current shown in FIG. 3A.

Referring to FIGS. 3A and 3B, the graph Ch2 shows the gate voltage generated by the switch driving circuit 162 of FIG. 2. The gate voltage generally has a high voltage level, switching the transistor 161 in a conducting state. At a high frequency of 32.6 kHz, short, low voltage pulses are generated by the switch driving circuit 162, switching the transistor 161 in a non-conducting state during a short period at said high frequency.

When the gate voltage Ch2 is high, the transistor 161 is switched in a conducting state, and thus there is no voltage drop over the transistor 161 (source-drain). The drain voltage Ch1 indeed shows a low voltage level, when the gate voltage Ch2 is high.

Basically, when the drain voltage Ch1 is low, there is no voltage over the capacitor 14, thereby effectively reducing the circuit to a circuit of the primary winding 121 and the voltage source 18. In said circuit a current may be built up depending on the inductance of the primary winding 121. This is illustrated in graph Ch4, wherein the drain current Ch4 increases over time.

The current through the primary winding 121 comprises an amount of energy due to the inductance of the primary winding 121.

When the switch driving circuit 162 generates a low voltage pulse, thereby switching off the transistor 161 and reducing the drain current Ch4 to substantially zero, a resonant circuit is formed, since the capacitor 14 is added to the effective circuit. The current through the primary winding 121 rapidly flows towards the capacitor 14, thereby generating a high voltage pulse in the primary winding 121, as may be seen in the drain voltage Ch1. A peak voltage and a duration of the pulse is dependent on i.e. the combination of the inductance of the primary winding 121 and the capacitance of the capacitor 14, and therefore may be selected by selecting specific values of said inductance and said capacitance.

The high voltage pulse in the primary winding 121 generates a high voltage pulse in the secondary winding 122, which is coupled to the gas discharge lamp. Said high voltage pulse in the secondary winding 122 may thus breakdown the gas in the gas discharge lamp. Due to a high repetition rate and the generated peak voltage in the secondary winding 122, the ignition circuit according to the present invention is also suitable for driving the gas discharge lamp during the takeover period following the gas breakdown of the gas discharge lamp.

As mentioned above, the current through the primary winding 121 has to be built up over a certain period of time, thereby storing an amount of energy. To enable a high repetition rate of ignition pulses, the transistor 161 may be rapidly switched to a conducting state again after the ignition pulse has been generated, thereby preserving as much of said energy in the ignition circuit 10 as possible.

When the transistor 161 is switched to a conducting state again by the gate voltage Ch2, the drain current Ch4 flows through the body diode of the transistor 161, while the capacitor 14 unloads. Thus, any preserved energy is returned in the circuit and the current through the primary winding 121 is built up again, until a low voltage pulse is generated in the gate voltage Ch2.

Figure 4:
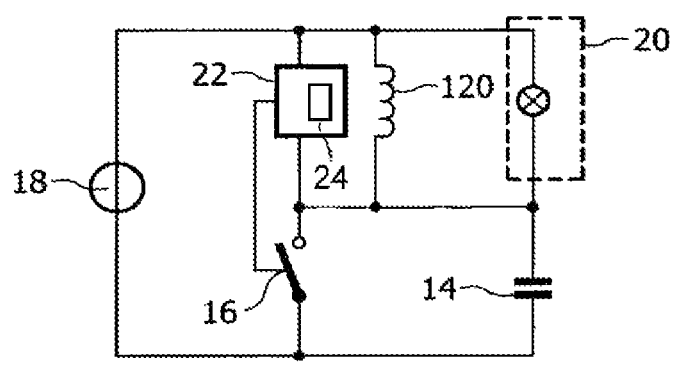
FIG. 4 shows a diagram of another embodiment of the ignition circuit according to the present invention.

FIG. 4 shows an embodiment, wherein the lamp circuit 20 is connected to a winding 120. The winding 120 is connected in series with the parallel circuit of a capacitor 14 and the switch 16. The switch 16 is controlled by a switch driving circuit 22 that is connected in parallel to the lamp circuit 20 and the winding 120. A voltage is supplied by the voltage source 18. The embodiment of FIG. 4 functions similarly to the embodiment of FIG. 2 except for the switch driving circuit 22.

The switch driving circuit 22 is provided with a voltage detection circuit 24. The voltage detection circuit 24 determines a voltage over the winding 120. The switch driving circuit 22 opens the switch 16 and a high voltage pulse is generated in said winding 120 as described above in relation to FIGS. 2, 3A and 3B. The voltage detection circuit 24 determines the voltage level over the winding 120. When said voltage drops and reaches zero again, the switch driving circuit 22 closes the switch 16 again. Thus, by closing the switch 16 when the voltage is substantially zero, a minimum amount of energy is dissipated in the circuit.

The present invention is not limited to the illustrated and described embodiment and it will be apparent to those skilled in the art how the above embodiment may be altered without departing from the scope of the invention.

In the above description as well as in the appended claims, 'comprising' is to be understood as not excluding other elements or steps and 'a' or 'an' does not exclude a plurality. Further, any reference signs in the claims shall not be construed as limiting the scope of the invention.

The invention claimed is:

1. An ignition circuit for a gas discharge lamp, wherein the circuit comprises an inductor connected in series with a parallel circuit of a transistor and a capacitor alone, said gas discharge lamp being operably connected in parallel with said inductor alone, wherein the parallel circuit consists of said transistor and said capacitor, and wherein said transistor and said capacitor are connected in parallel alone, and a switch driving circuit operably connected to drive the transistor, the switch driving circuit having a voltage detection circuit operably connected to detect voltage over the inductor, wherein the switch driving circuit is configured to close the transistor when the voltage detected over the inductor is substantially zero after a high voltage pulse.

2. The ignition circuit according to claim 1, wherein the transistor is configured to open when a current is flowing through said transistor and said inductor, thereby generating said high voltage pulse in said inductor, and wherein said transistor is configured to close after said high voltage pulse in said inductor is generated.

3. The ignition circuit according to claim 1, wherein the switch driving circuit is connected to a gate of said transistor.

4. The ignition circuit according to claim 1, wherein the ignition circuit is configured to generate the high voltage pulses at a repetition frequency of at least 10 kHz.

5. The ignition circuit according to claim 1, wherein the voltage detection circuit is connected in parallel with the inductor.

6. An ignition method for a gas discharge lamp, the method comprising:
   generating a current through an inductor, said inductor being operably connected in parallel with said gas discharge lamp alone, and said inductor being operably connected in series with a parallel circuit, wherein the parallel circuit consists of a transistor and a capacitor, and wherein said transistor and said capacitor are connected in parallel alone;
   opening said transistor thereby generating a high voltage pulse in said inductor; and
   detecting voltage over the inductor; and
   closing said transistor after generating said high voltage pulse in said inductor in response to the voltage detected over the inductor being substantially zero.

7. The ignition method according to claim 6, wherein the high voltage pulses are generated at a repetition frequency of at least 10 kHz.

8. The ignition circuit according to claim 6, wherein the voltage detection circuit is connected in parallel with the inductor.

9. An ignition circuit for a gas discharge lamp, wherein the circuit comprises an inductor connected in series with a parallel circuit consisting of a transistor and a capacitor, wherein said transistor and said capacitor are connected in parallel alone, said gas discharge lamp being coupled to said inductor, and a switch driving circuit operably connected to drive the transistor, the switch driving circuit having a voltage detection circuit operably connected to detect voltage over the inductor, wherein the switch driving circuit is configured to close the transistor when the voltage detected over the inductor is substantially zero after a high voltage pulse.

10. The ignition circuit according to claim 9, wherein the transistor is configured to open when a current is flowing through said transistor and said inductor, thereby generating said high voltage pulse in said inductor, and wherein said transistor is configured to close after said high voltage pulse in said inductor is generated.

11. The ignition circuit according to claim 9, wherein the switch driving circuit is connected to a gate of said transistor.

12. The ignition circuit according to claim 9, wherein the ignition circuit is configured to generate the high voltage pulses at a repetition frequency of at least 10 kHz.

13. The ignition circuit according to claim 9, wherein the gas discharge lamp is operably connected in parallel with said inductor alone.

14. The ignition circuit according to claim 9, wherein said gas discharge lamp is operably connected in parallel with said inductor alone.

* * * * *